US010962710B2

(12) United States Patent
Hiller (10) Patent No.: US 10,962,710 B2
(45) Date of Patent: Mar. 30, 2021

(54) MULTIDIMENSIONAL OPTICAL WAVEGUIDE IN PLANAR DIELECTRIC STRUCTURES

(71) Applicant: The Boeing Company, Chicago, IL (US)

(72) Inventor: Nathan D. Hiller, Irvine, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/996,585

(22) Filed: Jun. 4, 2018

(65) Prior Publication Data
US 2019/0369327 A1 Dec. 5, 2019

(51) Int. Cl.
*G02B 6/12* (2006.01)

(52) U.S. Cl.
CPC ..... *G02B 6/12002* (2013.01); *G02B 6/12004* (2013.01)

(58) Field of Classification Search
CPC .............. G02B 6/12002; G02B 6/0076; G02B 2006/12147
USPC ............................................ 385/14, 129–132
See application file for complete search history.

(56) References Cited

U.S. PATENT DOCUMENTS

| | | | | | |
|---|---|---|---|---|---|
| 5,159,699 A | * | 10/1992 | de Monts | ............ | G01N 33/564 385/130 |
| 5,917,980 A | * | 6/1999 | Yoshimura | ............ | G02B 6/138 385/122 |
| 6,122,416 A | * | 9/2000 | Ooba | ............ | G02F 1/3132 385/131 |
| 6,282,335 B1 | * | 8/2001 | Losch | ............ | G02B 6/12002 385/14 |
| 6,661,942 B1 | * | 12/2003 | Gharavi | ............ | G02B 6/12007 385/122 |
| 6,724,968 B2 | * | 4/2004 | Lackritz | ............ | B82Y 30/00 385/131 |
| 7,085,453 B2 | * | 8/2006 | Nagai | ............ | G02B 6/12002 385/28 |
| 7,095,920 B1 | * | 8/2006 | Little | ............ | G02B 6/12002 385/131 |
| 7,292,752 B2 | * | 11/2007 | Faccio | ............ | G02F 1/3132 385/131 |
| 9,122,006 B1 | * | 9/2015 | Roth | ............ | G02B 6/126 |
| 9,360,626 B2 | * | 6/2016 | Savchenkov | ............ | G02B 6/29337 |
| 9,400,354 B2 | * | 7/2016 | Dumais | ............ | G02B 6/126 |

(Continued)

FOREIGN PATENT DOCUMENTS

JP 2-52316 * 2/1990

OTHER PUBLICATIONS

"Integrated Photonics" by Pollock and Lipson, 2003.*

(Continued)

*Primary Examiner* — Robert Tavlykaev
(74) *Attorney, Agent, or Firm* — Coats & Bennett, PLLC (57) ABSTRACT

Aspects of the present disclosure disclose apparatuses, systems, and methods for providing an electromagnetic wave from one layer of a photonic circuit structure to another layer of the photonic circuit structure in at least one of the x-direction, the y-direction, and the z-direction. In so doing, aspects of the present disclosure enable the fabrication and use of multi-dimensional photonic circuit structures, and thus improve the capacity, power, weight, size, and/or cost of the circuits implemented by such multi-dimensional photonic circuit structures.

22 Claims, 9 Drawing Sheets

(56) References Cited

U.S. PATENT DOCUMENTS

| | | | |
|---|---|---|---|
| 9,529,158 B2* | 12/2016 | Sorger | G02B 6/3596 |
| 10,371,895 B2* | 8/2019 | Painchaud | G02B 6/14 |
| 2003/0215189 A1* | 11/2003 | Lee | G02B 6/12002 |
| | | | 385/50 |
| 2004/0264833 A1 | 12/2004 | McIntyre | |
| 2010/0215313 A1* | 8/2010 | Matsuoka | G02B 6/43 |
| | | | 385/14 |
| 2013/0156364 A1 | 6/2013 | Chen et al. | |
| 2013/0315536 A1 | 11/2013 | Huang | |
| 2014/0056554 A1 | 2/2014 | Brunner et al. | |
| 2014/0294341 A1* | 10/2014 | Hatori | G02B 6/12 |
| | | | 385/14 |
| 2015/0063768 A1 | 3/2015 | Budd et al. | |
| 2016/0139334 A1 | 5/2016 | Sakakibara et al. | |
| 2016/0266321 A1* | 9/2016 | Tummidi | G02B 6/30 |
| 2017/0139132 A1 | 5/2017 | Patel et al. | |
| 2017/0254951 A1 | 9/2017 | Dumais et al. | |

OTHER PUBLICATIONS

"Three-guide optical couplers in GaAs" by Donnelly et al, Journal of Lightwave Technology, vol. LT-1, No. 2, pp. 417-424, 1983.*

"Optical Multi-Mode Interference Devices Based on Self-Imaging: Principles and Applications" by Soldano et al, Journal of Lightwave Technology, vol. 13, No. 4, pp. 615-627, 1995.*

"The Crosstalk in Three-Waveguide Optical Directional Couplers" by Chen et al, IEEE Journal of Quantum Electronics, vol. QE-22, No. 7, pp. 1039-1041, 1986.*

"Fast and Robust Beam Coupling in a Three Waveguide Directional Coupler" by Tseng et al, IEEE Photonics Technology Letters, vol. 25, No. 24, pp. 2478-2481, 2013.*

EPO Communication (EPO Form 1507N) and Extended European Search Report for EP 191781533 dated Aug. 10, 2019, pp. 1-8.

* cited by examiner

MULTIDIMENSIONAL OPTICAL WAVEGUIDE IN PLANAR DIELECTRIC STRUCTURES

BACKGROUND

As the use of circuits across all industries continues to increase, efforts continue to look for ways to reduce the cost, size/footprint, weight, and/or power of such circuits while increasing their speed and/or capacity. To that end, 3-Dimensional (3D) electronic circuits have been developed. 3-D circuits use multiple stacked planar structures to reduce the footprint of the circuitry, where planar structures in the stack include electrical circuit(s), and electrical signals are coupled from one planar structure to the next. Such 3-D electrical circuits, however, tend to be slow and consume a lot of power, and thus put off a lot of heat.

Photonic circuits transfer data among computer chips via laser light, and thus carry significantly more data than the corresponding electrical circuits, and thus provide a faster and lower power alternative, e.g., by an order of magnitude, to electrical circuits. Further, due to improvements to silicon fabrication techniques, e.g., the use of silicon foundry manufacturing for wafer-scale fabrication, the cost of photonic chips is now inversely proportional to the circuit density. These factors make 3D photonic circuits an increasingly interesting option, resulting in the expectation that the market for photonic circuits will grow 1000% over the next five years. However, controlling the movement of light in such 3D photonic circuits, e.g., in the z-direction, is very difficult. As such, there remains a need for improvements in 3D photonic technologies.

SUMMARY

According to aspects of the present disclosure, apparatuses, systems, and methods are presented for providing an electromagnetic wave from one layer of a photonic circuit structure to another layer of the photonic circuit structure in at least one of the x-direction, the y-direction, and the z-direction.

According to the present disclosure, a multi-dimensional photonic circuit structure comprises a substrate, a first layer, and a second layer. The substrate has a height along a z-direction, a width along an x-direction, and a length along a y-direction. The first layer is associated with the substrate and comprises a first waveguide. The second layer is associated with the substrate and comprises a second waveguide. The second waveguide has an orientation relative to an orientation of the first waveguide that defines an electromagnetic coupling of an electromagnetic wave between the first and second waveguides in at least one of the x-direction, the y-direction, and the z-direction.

According to a further aspect, the substrate comprises a planar structure comprising a first side comprising the first layer and a second side spaced from the first side in the z-direction and comprising the second layer. The first waveguide is disposed on or at least partially within the first side of the planar structure. The second waveguide is disposed on or at least partially within the second side of the planar structure such that the orientation of the second waveguide relative to the orientation of the first waveguide defines the electromagnetic coupling between the first and second waveguides in the z-direction.

According to a further aspect, the first waveguide is disposed within the planar structure such that a surface of the first waveguide is even with a surface of the first side, and the second waveguide is disposed within the planar structure such that a surface of the second waveguide is even with a surface of the second side.

According to a further aspect, the substrate comprises a first planar structure comprising the first layer and a second planar structure adjacent the first planar structure and comprising the second layer. The first waveguide is comprised on or at least partially within the first planar structure. The second waveguide is comprised on or at least partially within the second planar structure such that the orientation of the second waveguide relative to the orientation of the first waveguide defines the electromagnetic coupling between the first and second waveguides in the z-direction.

According to a further aspect, the first planar structure comprises a first surface and a second surface spaced apart in the z-direction, and the second planar structure comprises a third surface and a fourth surface spaced apart in the z-direction. The first waveguide is disposed within the first planar structure such that a surface of the first waveguide is even with the first surface. The second waveguide is disposed within the second planar structure such that a surface of the second waveguide is even with the third surface. The second surface is adjacent the third surface.

According to a further aspect, the substrate comprises a planar structure comprising a first side and a second side spaced from the first side in the z-direction. One of the first and second sides comprises the first and second layers. The first waveguide and the second waveguide are comprised on or at least partially within the planar structure such that the orientation of the second waveguide relative to the orientation of the first waveguide defines the electromagnetic coupling between the first and second waveguides in at least one of the x-direction and the y-direction.

According to a further aspect, the first layer further comprises a first photonic circuit coupled to the first waveguide, and the second layer further comprises a second photonic circuit coupled to the second waveguide. The electromagnetic coupling between the first and second waveguides provides an electromagnetic wave output by the first photonic circuit to an input of the second photonic circuit or an electromagnetic wave output by the second photonic circuit to an input of the first photonic circuit.

According to a further aspect, the orientation of the second waveguide relative to the orientation of the first waveguide is defined by at least one of a distance between the first and second waveguides in the z-direction and an amount of overlap between the first and second waveguides in the x-direction and the y-direction; a distance between the first and second waveguides in the x-direction and an amount of overlap between the first and second waveguides in the y-direction and the z-direction; a distance between the first and second waveguides in the y-direction and an amount of overlap between the first and second waveguides in the x-direction and the z-direction; dimensions of the first and second waveguides; and an angular orientation of the second waveguide relative to the first waveguide.

According to a further aspect, the electromagnetic coupling between the first and second waveguides is further defined by at least one of a material of the substrate; a material of the first and second waveguides; a temperature of at least one of the first and second waveguides;

an absolute temperature or a relative difference between temperatures of the first and second waveguides; a stress of at least one of the first and second waveguides; an electromagnetic field across one or both of the first and second waveguides; a magnetic field across one or both of the first and second waveguides; and an electric field across one or both of the first and second waveguides.

According to a further aspect, the electromagnetic wave comprises light.

The present disclosure further discloses a method of coupling an electromagnetic wave in a multi-dimensional photonic circuit structure comprising a substrate, a first layer associated with the substrate and comprising a first waveguide, and a second layer associated with the substrate and comprising a second waveguide. The substrate has a height along a z-direction, a width along an x-direction, and a length along a y-direction. The method comprises configuring an orientation of the first waveguide and configuring an orientation of the second waveguide such that the orientation of the second waveguide relative to the orientation of the first waveguide defines an electromagnetic coupling of the electromagnetic wave between the first and second waveguides in at least one of the x-direction, the y-direction, and the z-direction. The method further comprises electromagnetically coupling the electromagnetic wave between the first waveguide and the second waveguide according to the defined electromagnetic coupling.

According to a further aspect, the substrate comprises a planar structure comprising a first side comprising the first layer and a second side spaced from the first side in the z-direction and comprising the second layer. According to one aspect, configuring the orientation of the first waveguide comprises configuring the first waveguide on or at least partially within the first side of the planar structure, and configuring the orientation of the second waveguide comprises configuring the second waveguide on or at least partially within the second side of the planar structure such that the orientation of the second waveguide relative to the orientation of the first waveguide defines the electromagnetic coupling between the first and second waveguides in the z-direction.

According to a further aspect, configuring the orientation of the first waveguide comprises configuring the first waveguide within the planar structure such that a surface of the first waveguide is even with a surface of the first side, and configuring the orientation of the second waveguide comprises configuring the second waveguide within the planar structure such that a surface of the second waveguide is even with a surface the second side.

According to a further aspect, the substrate comprises a first planar structure comprising the first layer, and a second planar structure adjacent the first planar structure and comprising the second layer. According to one aspect, configuring the orientation of the first waveguide comprises configuring the first waveguide on or at least partially within the first planar structure, and configuring the orientation of the second waveguide comprises configuring the second waveguide on or at least partially within the second planar structure such that the orientation of the second waveguide relative to the orientation of the first waveguide defines the electromagnetic coupling between the first and second waveguides in the z-direction.

According to a further aspect, the first planar structure comprises a first surface and a second surface spaced apart in the z-direction, and the second planar structure comprises a third surface and a fourth surface spaced apart in the z-direction. The second surface is adjacent the third surface. According to one aspect, configuring the orientation of the first waveguide comprises configuring the first waveguide within the first planar structure such that a surface of the first waveguide is even with the first surface, and configuring the orientation of the second waveguide comprises configuring the second waveguide within the second planar structure such that a surface of the second waveguide is even with the third surface.

According to a further aspect, the substrate comprises a planar structure comprising a first side and a second side spaced from the first side in the z-direction. One of the first and second sides comprises the first and second layers. According to one aspect, configuring the orientations of the first and second waveguides comprises configuring the first and second waveguides on or at least partially within the planar structure such that the orientation of the second waveguide relative to the orientation of the first waveguide defines the electromagnetic coupling between the first and second waveguides in at least one of the x-direction and the y-direction.

According to a further aspect, the first layer further comprises a first photonic circuit coupled to the first waveguide, and the second layer further comprises a second photonic circuit coupled to the second waveguide. According to one aspect, electromagnetically coupling the electromagnetic wave between the first and second waveguides provides an electromagnetic wave output by the first photonic circuit to an input of the second photonic circuit or an electromagnetic wave output by the second photonic circuit to an input of the first photonic circuit.

According to a further aspect, configuring the orientation of the first and second waveguides comprises at least one of configuring a distance between the first and second waveguides in the z-direction and an amount of overlap between the first and second waveguides in the x-direction and the y-direction; configuring a distance between the first and second waveguides in the x-direction and an amount of overlap between the first and second waveguides in the y-direction and the z-direction; configuring a distance between the first and second waveguides in the y-direction and an amount of overlap between the first and second waveguides in the x-direction and the z-direction; configuring dimensions of the first and second waveguides; and configuring an angular orientation of the second waveguide relative to the first waveguide.

DETAILED DESCRIPTION

Aspects of the present disclosure are directed to methods, apparatuses, systems, computer program products, and/or software for the manufacture and/or use of multi-dimensional photonic circuit structures that facilitate movement of electromagnetic waves throughout the structure via coupling waveguides. Such multi-dimensional photonic circuit structures may be implemented anywhere 3-dimensional (3D) circuits are beneficial, including but not limited to, aircraft operational and control systems; space, air, and sea-based drones; energy harvesting cyclocopters; optical communication systems for terrestrial and space applications; etc. By providing means for the electromagnetic waves to move throughout the multi-dimensional circuit structure in any direction, including the z-direction, aspects of the present disclosure provide a circuit structure that improves upon existing photonic circuits and electrical circuits, e.g., in cost, complexity, size, capacity, weight, and/or power consumption.

Figures 1A, 1B:
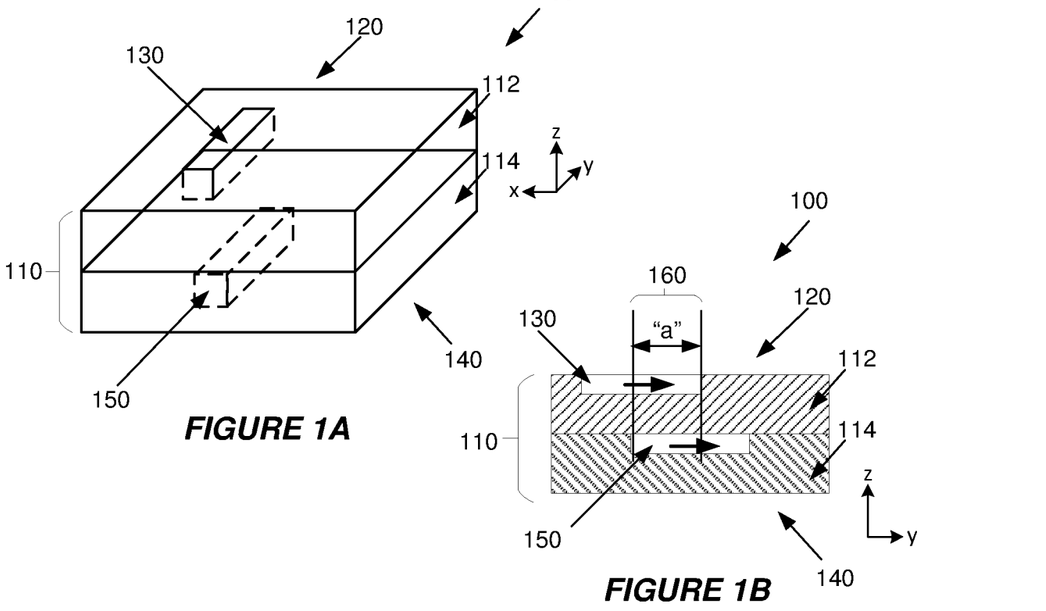
FIGS. 1A-1B show an exemplary substrate according to one exemplary aspect.

FIGS. 1A-1B show an exemplary multi-dimensional photonic circuit structure 100, according to aspects of the present disclosure, where FIG. 1A shows the structure 100 from a 3D perspective, and FIG. 1B shows a side view of the structure 100 of FIG. 1A. Multi-dimensional photonic circuit structure 100 comprises a substrate 110 comprising multiple layers 120, 140, where a first layer 120 includes a first waveguide 130 and a second layer 140 includes a second waveguide 150. While FIGS. 1A-1B show a substrate 110 comprising two planar structures 112, 114, where each layer 120, 140, and thus each waveguide 130, 150, are in a different planar structure 112, 114, one skilled in the art will appreciate that the solution is not limited to such substrates 110. It will be appreciated that aspects of the present disclosure also apply to substrates 110 with layers on opposing sides of a planar structure 112 (e.g., FIGS. 4A-4C), substrates 110 with more than two planar structures (e.g., FIGS. 5C-5D), substrates 110 with multiple layers 120, 140 on one side of a planar structure 112 (FIGS. 6A-6D), etc., as discussed further herein. Thus, FIGS. 1A-1B should be construed as illustrative and not limiting.

Structure 100 comprises a substrate 110, a first layer 120 (e.g., of a first planar structure 112) and a second layer 140 (e.g., of a second planar structure 114), where the first layer 120 comprises a first waveguide 130 and the second layer 140 comprises a second waveguide 150. The first and second waveguides 130, 150 couple an electromagnetic wave according to an electromagnetic coupling defined by the orientation of one of the first and second waveguides 130, 150 relative to the other of the first and second waveguides 130, 150. As shown in FIGS. 1A-1B, the electromagnetic wave is couple in the z-direction, e.g., either from the second waveguide 150 to the first waveguide 130 or from the first waveguide 130 to the second waveguide 150. It will be appreciated, however, that waveguides 130, 150 may be oriented to provide electromagnetic coupling in any direction, including the x-direction, the y-direction, and/or the z-direction. As such, aspects of the present disclosure provide a way to efficiently move electromagnetic waves within a multi-dimensional photonic circuit structure 100.

Figure 2:
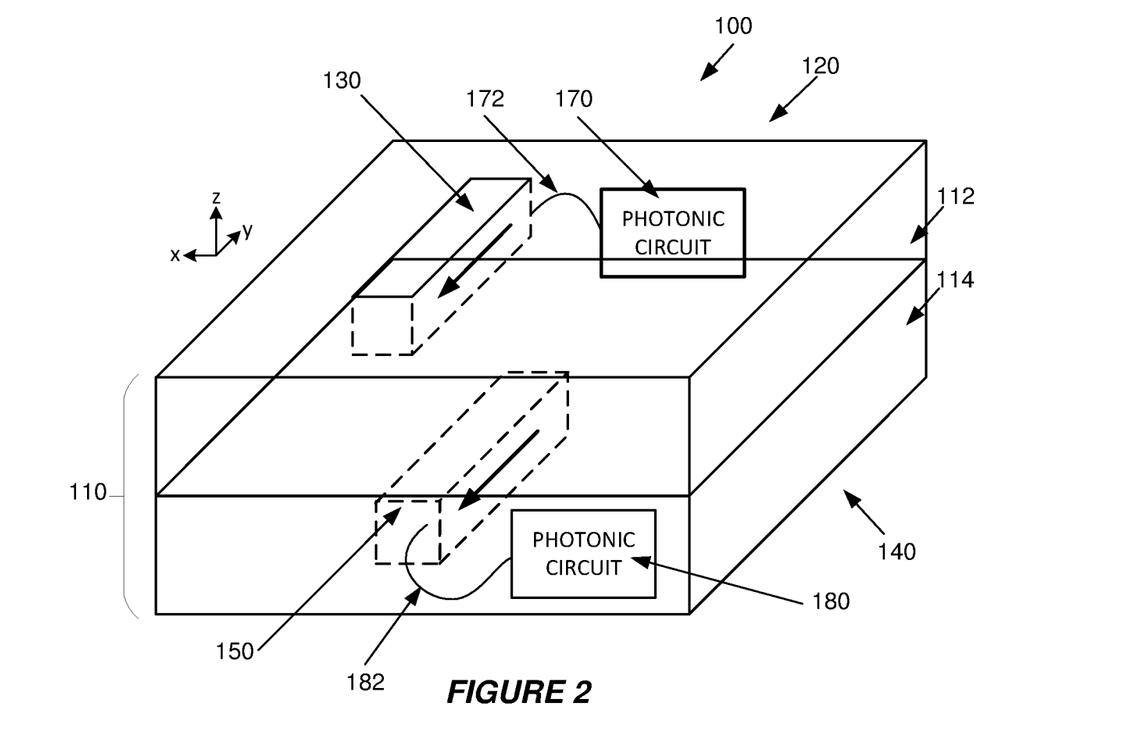
FIG. 2 shows one exemplary substrate, in three dimensions, according to another exemplary aspect.

As shown in FIG. 2, the waveguides 130, 150 may be coupled to respective photonic circuits 170, 180 such that an electromagnetic wave output by one photonic circuit 170, 180 couples from one waveguide to the next waveguide and is input to the other photonic circuit 180, 170. According to one aspect an electromagnetic wave output by a first photonic circuit 170 is input to the first waveguide 130 via a coupler 172 (e.g., a fiber or other photonic coupler), electromagnetically coupled to the second waveguide 150 as described herein, and input to a second photonic circuit 180 via another coupler 182 (e.g., a fiber or other photonic coupler). According to another aspect an electromagnetic wave output by second photonic circuit 180 is input to the second waveguide 150 via coupler 182, electromagnetically coupled to the first waveguide 130 as described herein, and input to first photonic circuit 170 via coupler 172. As such, the waveguides 130, 150 disclosed herein enable photonic/electromagnetic signals/waves to be conveyed to any photonic circuit 170, 180 within the multi-dimensional photonic circuit structure 100.

Figure 3:
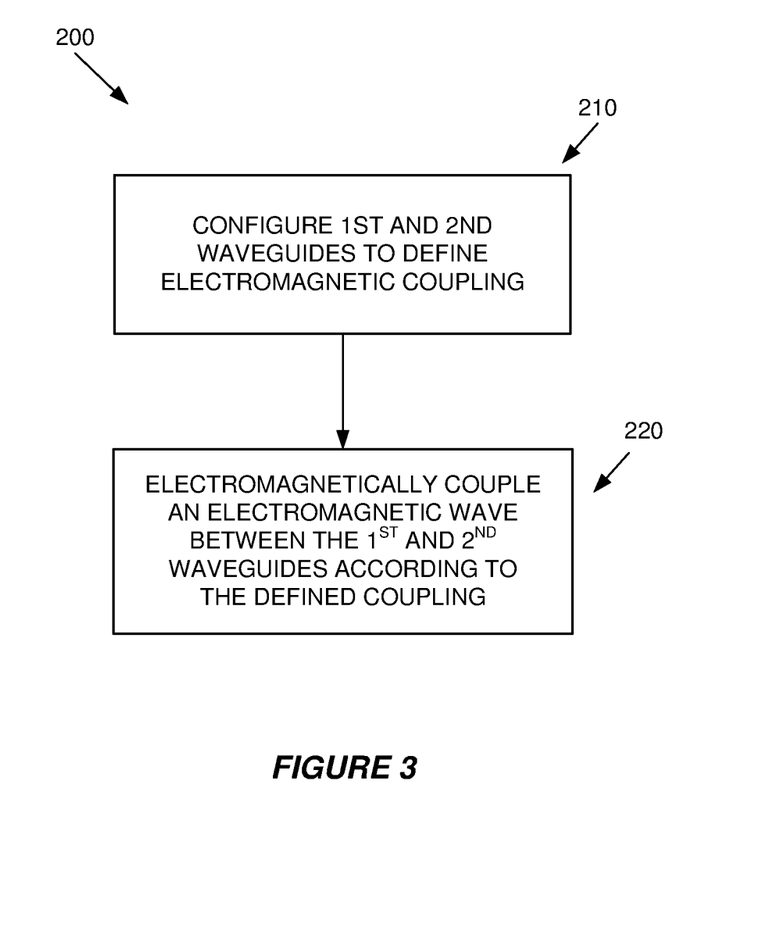
FIG. 3 shows one exemplary electromagnetic coupling method according to one exemplary aspect.

FIG. 3 shows an exemplary method 200 for electromagnetic coupling within a multi-dimensional photonic circuit structure 100 according to aspects disclosed herein. Method 200 applies to multi-dimensional photonic circuit structures 100 comprising a substrate 110, a first layer 120 associated with the substrate 110 and comprising a first waveguide 130, and a second layer 140 associated with the substrate 110 and comprising a second waveguide 150. The substrate 110 has a height along a z-direction, a width along an x-direction, and a length along a y-direction. The method 200 comprises configuring an orientation of the first waveguide 130 and configuring an orientation of the second waveguide 150 such that the orientation of the second waveguide 150 relative to the orientation of the first waveguide 130 defines an electromagnetic coupling of the electromagnetic wave between the first and second waveguides 130, 150 in at least one of the x-direction, the y-direction, and the z-direction (block 210). The method 200 further comprises electromagnetically coupling the electromagnetic wave between the first waveguide 130 and the second waveguide 150 according to the defined electromagnetic coupling (block 220).

According to exemplary aspects, the electromagnetic coupling is defined by the orientation of one waveguide, e.g., the second waveguide 150, relative to the orientation of another waveguide, e.g., the first waveguide 130. For example, a distance between the first and second waveguides 130, 150 in the z-direction and an amount of overlap between the first and second waveguides 130, 150 in the x-direction and the y-direction at least partially defines the electromagnetic coupling in the z-direction. According to another aspect, electromagnetic coupling in the x-direction is at least partially defined by a distance between the first and second waveguides 130, 150 in the x-direction and an amount of overlap between the first and second waveguides 130, 150 in the y-direction and the z-direction. According to another aspect, the electromagnetic coupling in the y-direction is at least partially defined by a distance between the first and second waveguides 130, 150 in the y-direction and an amount of overlap between the first and second waveguides 130, 150 in the x-direction and the z-direction. As used herein, "overlap" refers to a structural overlap 160 in at least one dimension of one waveguide relative to the other waveguide, where the waveguides 130, 150 are spaced apart in another dimension. For example, as shown in FIG. 1B, one end of the first waveguide 130 overlaps one end of the second waveguide 150 in the y-direction such that the overlap 160 has a distance of "a" in the y-direction. While FIG. 1B only shows the overlap in the y-direction, it will be appreciated that because the waveguide has x and y dimensions, the overlap for this example also occurs in the x-direction as well in most cases.

In addition to the spacing and overlap aspects of the relative waveguide orientations, it will be appreciated that additional orientation aspects may also define the electromagnetic coupling, including but not limited to, the dimensions of the first and second waveguides 130, 150 and an angular orientation of the second waveguide 150 relative to the first waveguide 130. According to some aspects, the first and second waveguides 130, 150 have the same dimensions and are parallel to each other. It will be appreciated, however, that such is not required.

According to a further aspect, the electromagnetic coupling between the first and second waveguides 130, 150 may alternatively or further be defined by:
- a material of the substrate 110 and/or planar structures 112, 114;
- a material of the first and second waveguides 130, 150;
- a temperature of at least one of the first and second waveguides 130, 150;
- an absolute temperature or a relative difference between the temperatures of the first and second waveguides 130, 150;
- an electromagnetic field across one or both of the first and second waveguides 130, 150;
- a magnetic field across one or both of the first and second waveguides 130, 150;
- an electric field across one or both of the first and second waveguides 130, 150;
- a stress of at least one of the first and second waveguides 130, 150; and/or
- a material surrounding one or both of the first and second waveguides 130, 150.

For example, when the first and second waveguides 130, 150 have the same dimensions, are parallel, are made of the same material, are at the same temperature, and are surrounded by the same material (e.g., FIGS. 5C-5D), the coupling efficiency is high (assuming the distance separating the first and second waveguides 130, 150 is selected appropriately). In an alternate example, when the first and second waveguides 130, 150 have the same dimensions, are parallel, but are not surrounded by the same material (e.g., FIGS. 1A-1B), the coupling efficiency is low even when the distance separating the first and second waveguides 130, 150 is selected appropriately unless other elements of the first and/or second waveguides 130, 150 are altered, e.g., made of different materials, are at different temperatures, etc. It will be appreciated that waveguide coupling is well understood in the art, and thus is not discussed further herein.

Figure 4A:
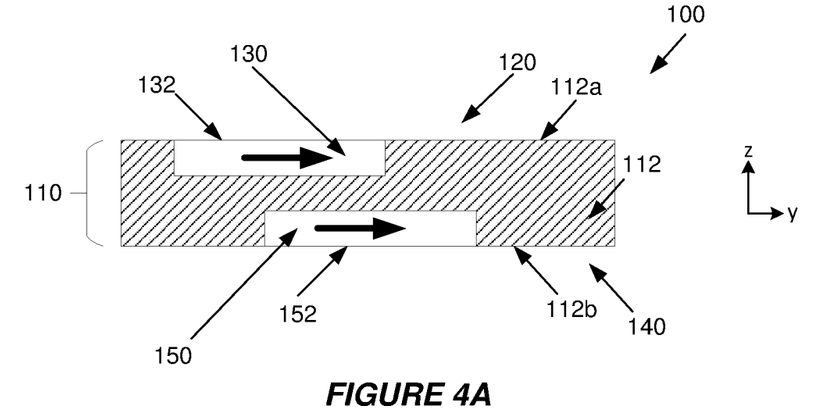
FIGS. 4A-4C show side views of a planar structure with multiple layers according to exemplary aspects.
Figure 4B:
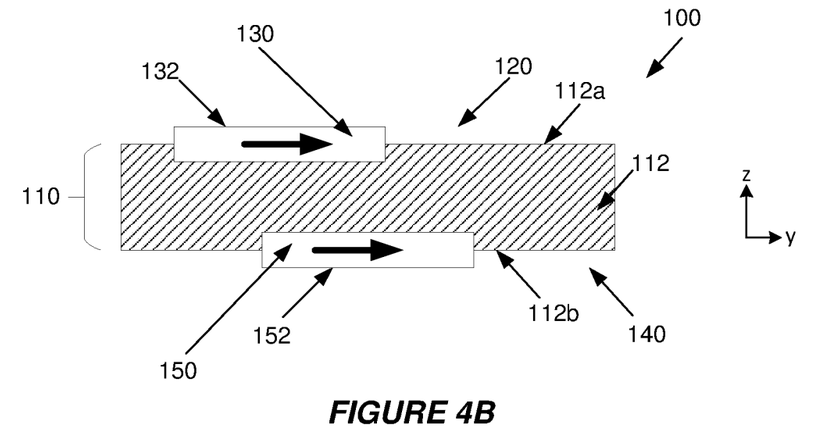
Figure 4C:
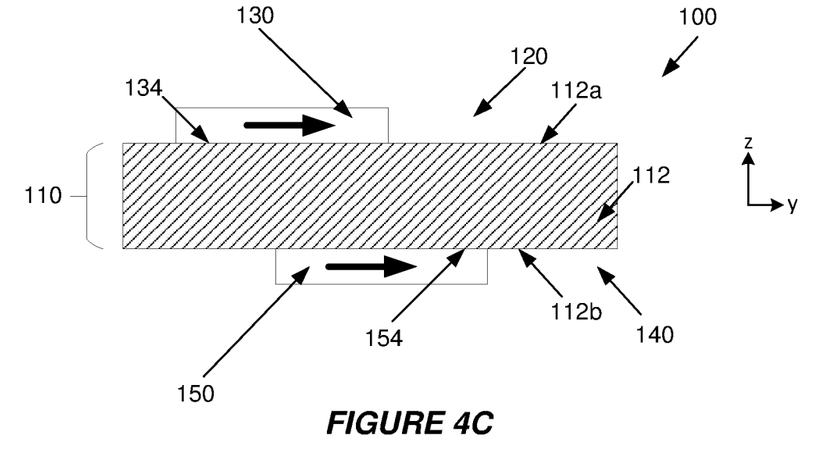

FIGS. 4A-4C show multiple examples of aspects of the present disclosure, where different layers 120, 140 are part of the same planar structure 112, and thus different waveguides 130, 150 are part of the same planar structure 112. According to these aspects, the planar structure 112 has a first side 112a comprising the first layer 120 and a second side 112b comprising the second layer 140, where the second side 112b is spaced from the first side 112a in the z-direction, and thus the first waveguide 130 is spaced from the second waveguide 150 in the z-direction. The first waveguide 130 is disposed on or at least partially within the first side 112a, while the second waveguide 150 is disposed on or at least partially within the second side 112b such that an electromagnetic wave couples between the first and second waveguides 130, 150 in the z-direction. For example, according to one aspect shown in FIG. 4A, the first waveguide 130 is disposed within the first side 112a such that a first surface 132 of the first waveguide 130 is even with a surface of the first side 112a, while the second waveguide 150 is disposed within the second side 112b such that a first surface 152 of the second waveguide 150 is even with a surface of the second side 112b. According to another aspect shown in FIG. 4B, the first waveguide 130 is partially disposed within the first side 112a such that the first surface 132 of the first waveguide 130 extends above the surface of the first side 112a, while the second waveguide 150 is partially disposed within the second side 112b such that the first surface 152 of the second waveguide 150 extends above the surface of the second side 112b. According to another aspect shown in FIG. 4C, the first waveguide 130 is disposed on the first side 112a such that a second surface 134 of the first waveguide 130 abuts the surface of the first side 112a, while the second waveguide 150 is disposed on the second side 112b such that a second surface 154 of the second waveguide 150 abuts the surface of the second side 112b. It will be appreciated that while the aspects of FIGS. 4A-4C show the waveguides both being disposed on or at least partially within the first and second sides 112a, 112b in the same manner, the aspects described herein do not require both to have the same orientation relative to the sides 112a, 112b of the planar structure 112. For example, one waveguide 130, 150 may be disposed in the corresponding side 112a, 112b as shown in FIG. 4A, while the other waveguide 130, 150 may be only partially disposed in the corresponding side 112a, 112b as shown in FIG. 4B. It will be appreciated that other combinations may alternatively be implemented.

Figure 5A:
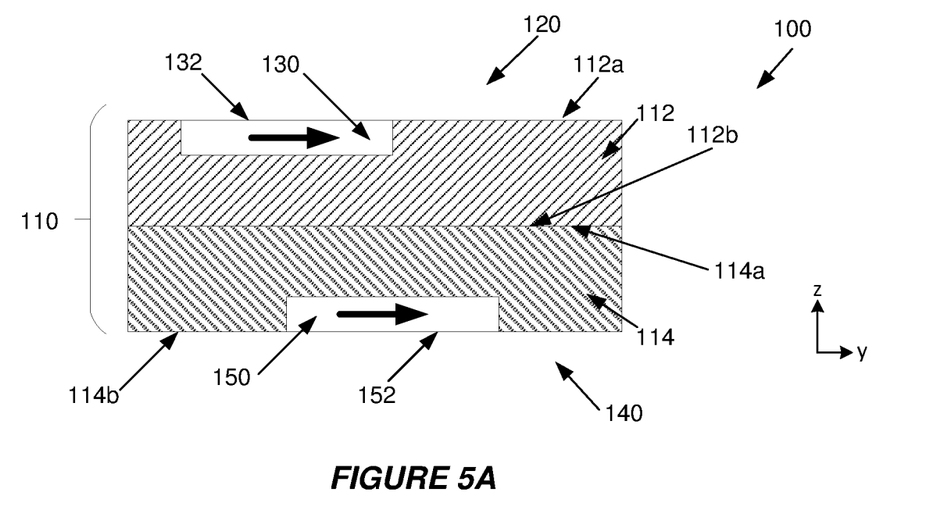
FIGS. 5A-5D show side views of multiple planar structures and multiple layers according to exemplary aspects.
Figure 5B:
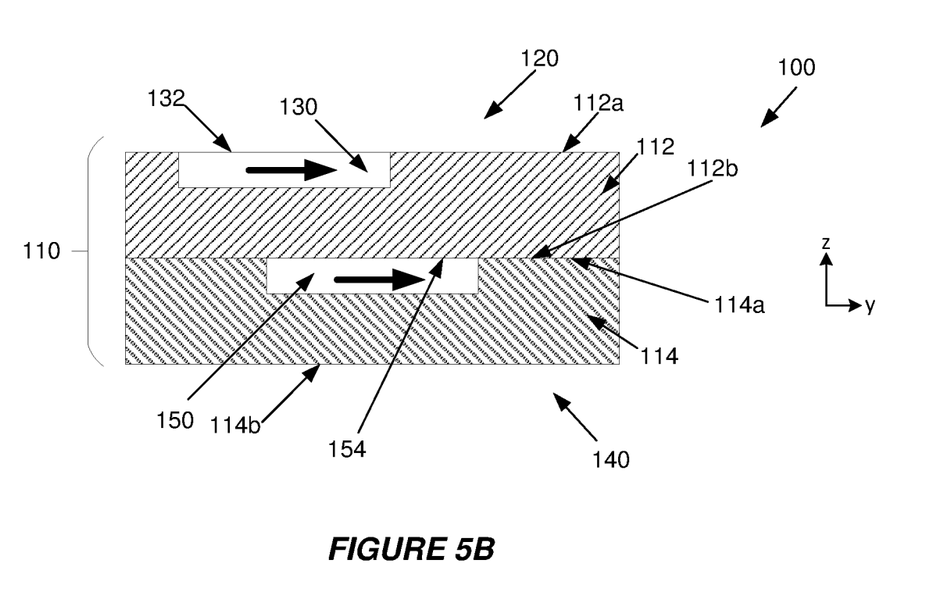
Figure 5C:
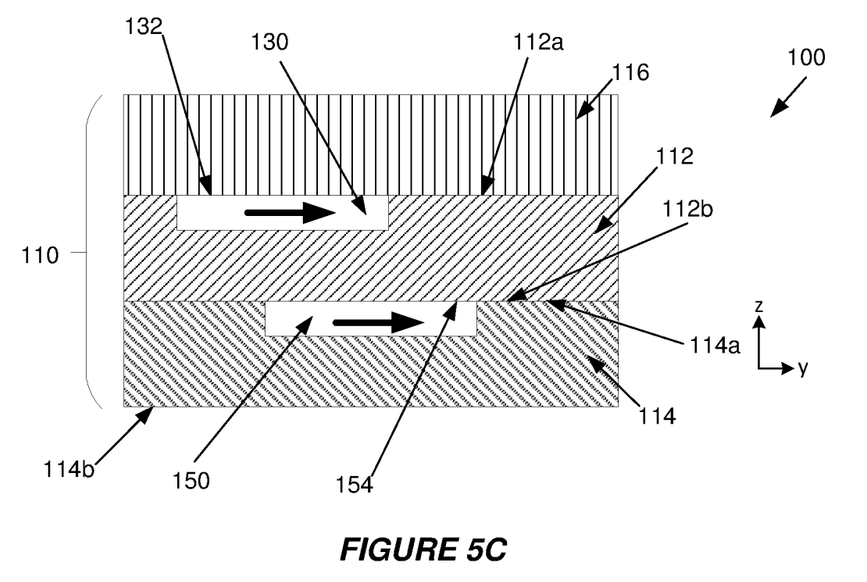
Figure 5D:
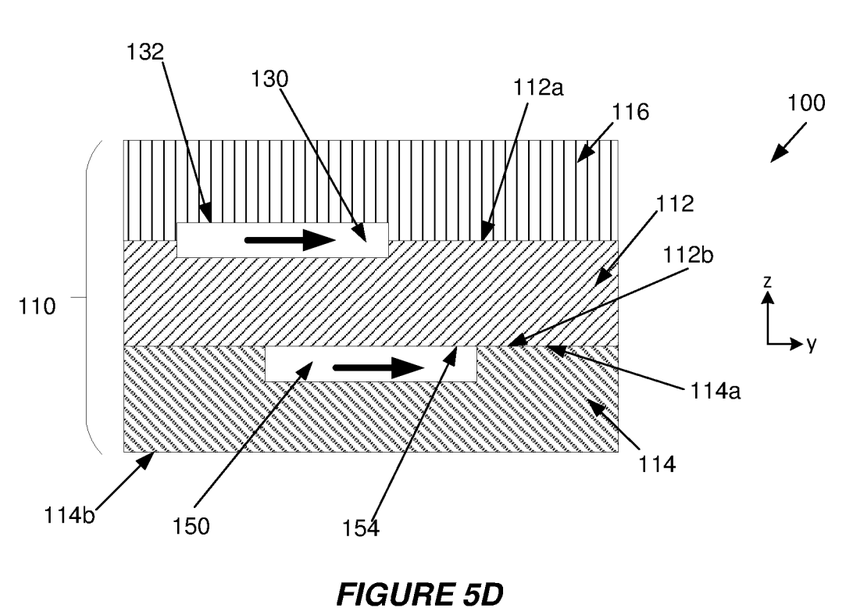

FIGS. 5A-5D show examples of aspects of the present disclosure where different layers 120, 140 are part of different planar structures 112, 114, and thus different waveguides 130, 150 are part of different planar structures 112, 114. A first planar structure 112 has sides 112a, 112b spaced in the z-direction, and comprises the first layer 120 (which comprises the first waveguide 130). A second planar structure 114 has sides 114a, 114b spaced in the z-direction and comprises the second layer 140 (which comprises the second waveguide 150). The first waveguide 130 is disposed on or at least partially within the first planar structure 112, while the second waveguide 150 is disposed on or at least partially within the second planar structure 114 such that an electromagnetic wave couples between the first and second waveguides 130, 150 in the z-direction. For example, according to one aspect, the first waveguide 130 is disposed within the first planar structure 112 such that a first surface 132 of the first waveguide 130, e.g., a top surface 132, is even with the surface of side 112a, while the second waveguide 150 is disposed within the second planar structure 114 such that a first surface 152 of the second waveguide 150 is even with the surface of side 114b, as shown in FIG. 5A. According to another aspect shown in FIG. 5B, the first waveguide 130 is disposed within the first planar structure 112 such that a first surface 132 of the first waveguide 130 is even with the surface of side 112a, while the second waveguide 150 is disposed within the second planar structure 114 such that a second surface 154 of the second waveguide 150 is even with the surface of side 114a and adjacent to the surface of side 112b. According to another aspect shown in FIG. 5C, the first waveguide 130 is disposed within the first planar structure 112 such that a first surface 132 of the first waveguide 130 is even with the surface of side 112a and adjacent a third planar structure 116, while the second waveguide 150 is disposed within the second planar structure 114 such that a second surface 154 of the second waveguide 150 is even with the surface of side 114a and adjacent the surface of side 112b of the first planar structure. It will be appreciated that other aspects may have one or both waveguides only partially disposed in one or both of the planar structures 112, 114 (e.g., as shown in FIG. 5D). For example, the first waveguide 130 may be partially disposed in planar structure 112 such that it extends above the surface of side 112a, as shown in FIG. 5D. According to this aspect, if another planar structure is disposed on top of the first planar structure 112, e.g., third planar structure 116, the third planar structure 116 may be configured with a cutout that enables the third planar structure to stack on top of the first planar structure 112 and surround the first waveguide 130, as shown in FIG. 5D. It will be appreciated that other combinations may alternatively be applied.

Figures 6A, 6B, 6C, 6D:
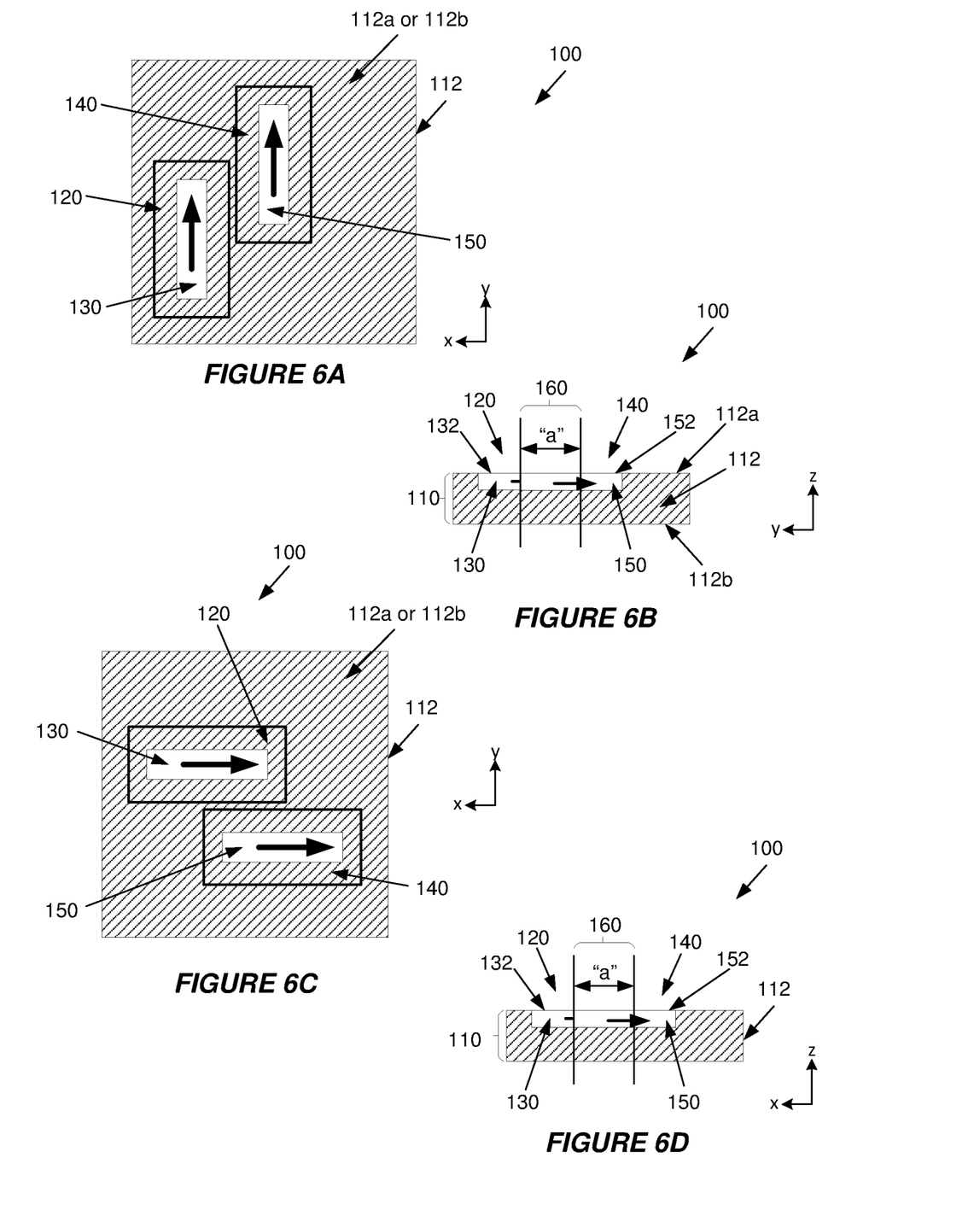
FIGS. 6A-6D show top and side views a planar structure with multiple layers according to exemplary aspects.

FIGS. 6A-6D show multiple examples of aspects of the present disclosure, where different layers 120, 140 are part of the same planar structure 112, and thus different waveguides 130, 150 are part of the same planar structure 112. According to these aspects, the planar structure 112 has a first side and a second side spaced from the first side in the z-direction, where the first layer 120 and the second layer 140 are disposed on the same side, e.g., the first waveguide 130 is disposed on or at least partially within the first side 112a, and the second waveguide 150 is disposed on or at least partially within the first side 112a such that an electromagnetic wave couples between the first and second waveguides 130, 150 in the x-direction (FIGS. 6A-6B) or the y-direction (FIGS. 6C-6D). As shown in FIGS. 6A-6B, when the coupling is in the x-direction, the waveguides 130, 150 are spaced in the x-direction but the overlap 160 is in the y-direction. As shown in FIGS. 6C-6D, when the coupling is in the y-direction, the waveguides 130, 150 are spaced in the y-direction but the overlap 160 is in the x-direction. According to one exemplary aspect, the first and second waveguides 130, 150 are disposed within the first planar structure 112 such that a first surface 132, 152 of the first and second waveguides 130, 150 is even with a surface of the first planar structure 112, e.g., the surface of the first side 112a. It will be appreciated, however, that such is not required, as previously discussed.

Figure 7A:
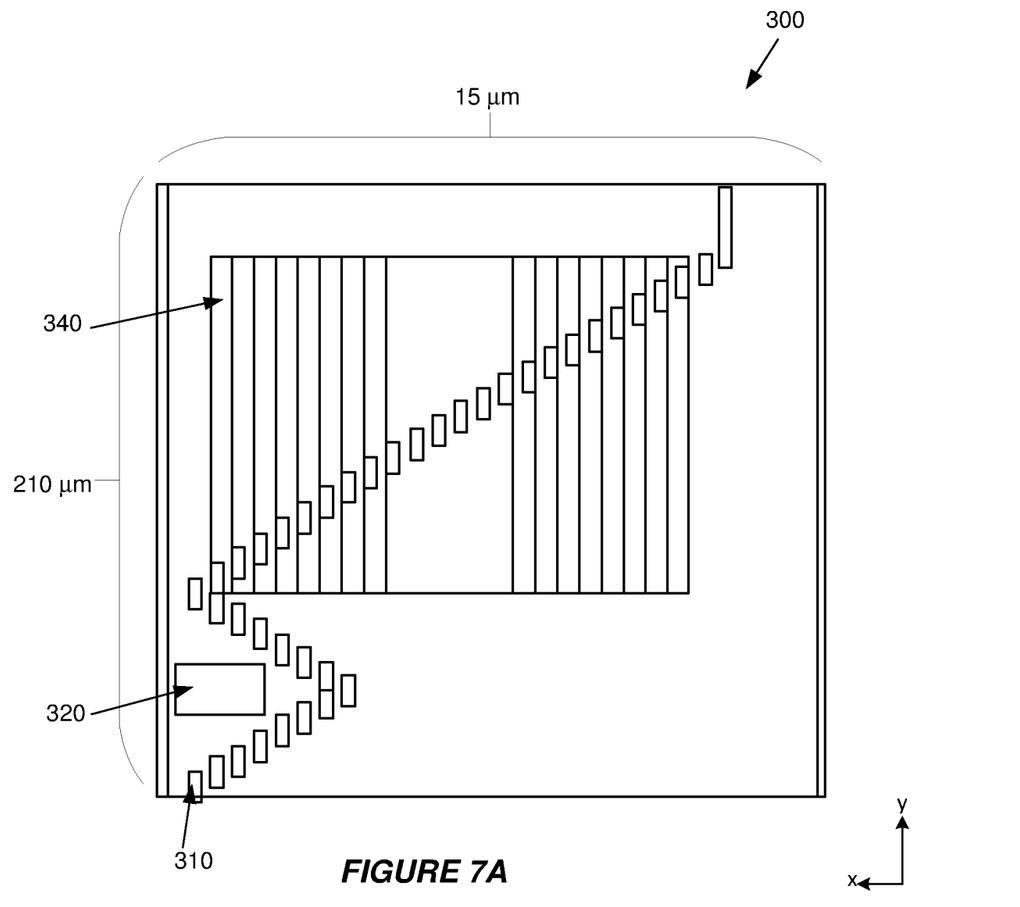
FIGS. 7A-7C show different views of a simulation substrate according to one exemplary aspect.
Figure 7B:
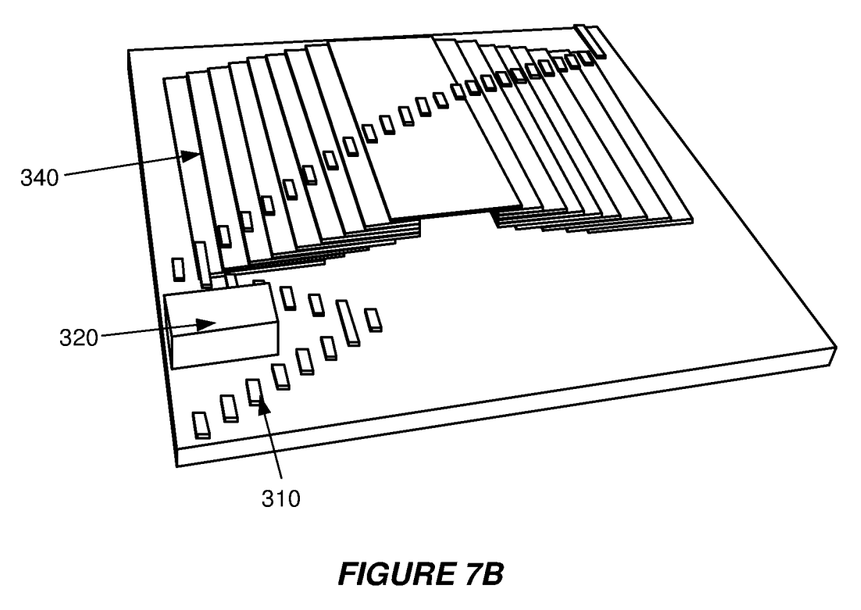
Figure 7C:
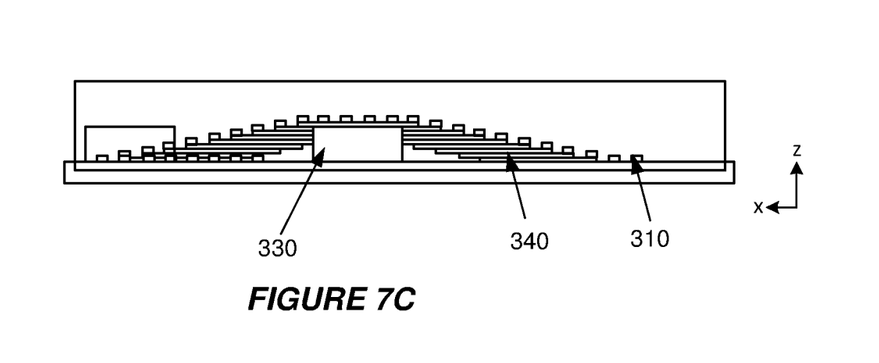
Figure 8A:
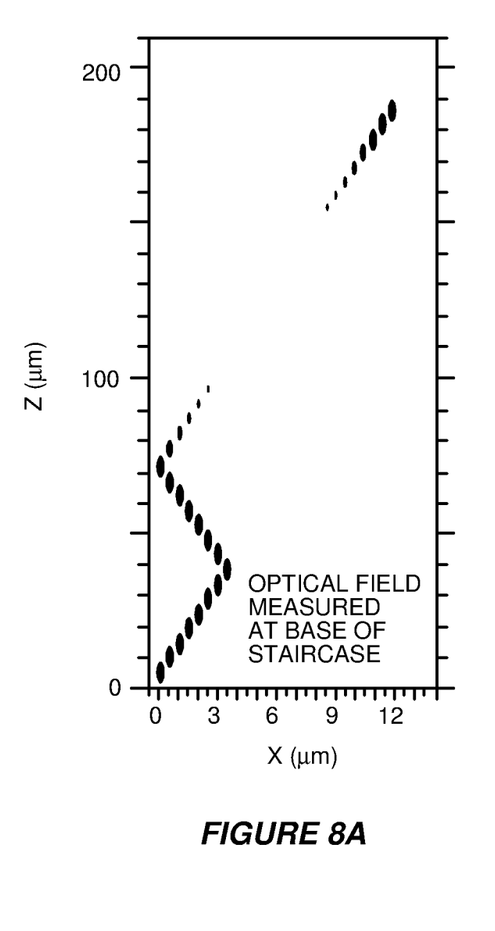
FIGS. 8A-8C show simulation results for the substrate of FIGS. 7A-7C.
Figure 8B:
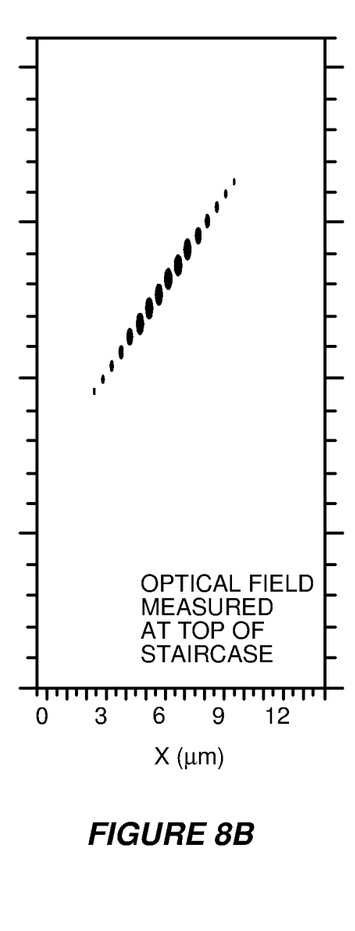
Figure 8C:
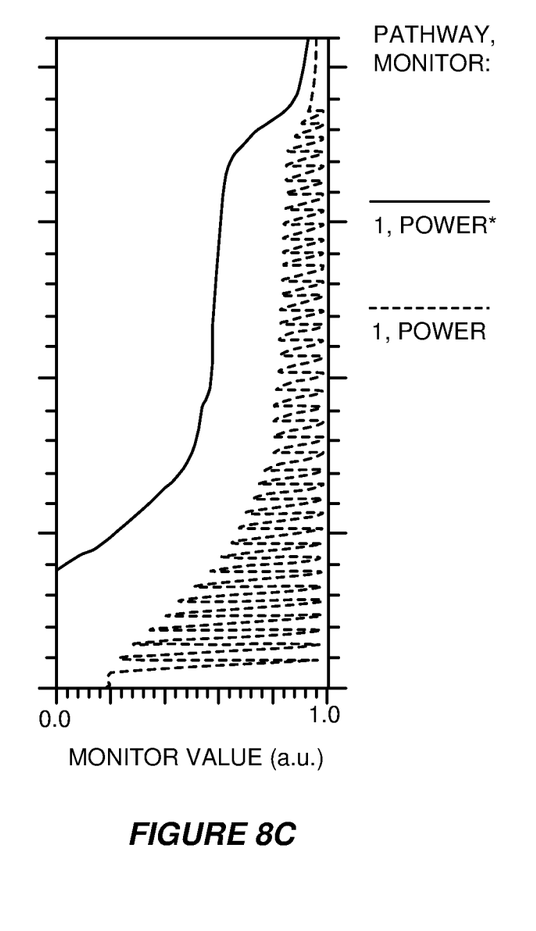

FIGS. 7A-7C show different views of an exemplary simulation structure 300 used to simulate the coupling between simulation waveguides 310 in the x-direction, the y-direction, and the z-direction, where each pair of waveguides 310 in FIGS. 7A-7C corresponds to the first and second waveguides 130, 150 disclosed herein. FIGS. 7A-7C simulate multiple waveguides 310 coupling electromagnetic waves in multiple dimensions to move the electromagnetic waves around multiple obstacles 320, 330, namely an x-y obstacle 320 and an x-z obstacle 330, where different waveguides 310 are part of different simulation planar structures 340 to get around the x-z obstacle 330. FIGS. 8A-8C show the results of the simulation using the structure 300 of FIGS. 7A-7C. As shown in FIG. 8A, the waveguides 310 efficiently couple the electromagnetic wave in the x-y direction to move the electromagnetic wave around obstacle 320. Further, as shown in FIG. 8B, the waveguides 310 efficiently couple the electromagnetic wave in the x-z direction to move the electromagnetic wave over obstacle 330. FIG. 8C shows two representations of the signal power as a function of distance along the coupled waveguide 310, demonstrating the efficiency of coupling waveguides as well as how improvements to manufacturing tolerances and reductions to material attenuation will reduce optical attenuation in such waveguides 310.

The aspects of the present disclosure couple electromagnetic waves between waveguides to move the electromagnetic waves around a multi-dimensional photonic circuit structure in the x-direction, the y-direction, and/or the z-direction. As such, the aspects of the present disclosure facilitate the manufacture and use of photonic circuits in multi-dimensional structures, which provides possible improvements in cost, efficiency, data rates, weight, and/or power consumption. An exemplary electromagnetic wave includes, but is not limited to light, particularly light in wavelengths common for electromagnetic coupling, e.g., 850 nm, 1300 nm, 1310 nm, 1500-1600 nm (e.g., 1550 nm), etc.

The waveguides 130, 150 and/or planar structures disclosed herein may be comprised of any material that facilitates the coupling of electromagnetic waves. Exemplary waveguide/planar structure materials include but are not limited to semiconductors, dielectrics, insulators, metals, nanostructures, and photonic crystals. Further, it will be appreciated that the waveguides 130, 150 may both comprise single-mode waveguides or may both comprise multi-mode waveguides. Alternatively, one of the waveguides 130, 150 may comprise a single-mode waveguide, while the other one of the waveguides 130, 150 may comprise a multi-mode waveguide.

Aspects of the present disclosure may, of course, be carried out in other ways than those specifically set forth herein without departing from essential characteristics therefrom. The aspects disclosed herein are to be considered in all respects as illustrative and not restrictive, and all changes coming within the meaning and equivalency range of the appended claims are intended to be embraced therein. In particular, although steps of particular processes or methods described herein are shown and described as being in a particular sequence or temporal order, the steps of any such processes or methods are not limited to being carried out in any particular sequence or order, absent an indication otherwise. Indeed, the steps in such processes or methods are generally carried out in various different sequences and orders according to particular aspects of the present disclosure while still falling within the scope of the present disclosure.

What is claimed is:

1. A multi-dimensional photonic circuit structure comprising:
a substrate comprising a height along a z-direction, a width along an x-direction, and a length along a y-direction; and
three or more discrete parallel waveguide segments physically separated and disconnected from one another by intervening gaps and progressively staggered in a signal path direction between first and second photonic circuits, said three or more discrete waveguide segments disposed on or at least partially within the substrate and configured to provide electromagnetic coupling of a propagating wave between the three or more discrete waveguide segments to couple the first and second photonic circuits, each of said three or more discrete waveguide segments comprising single-mode waveguide segments having identical material and dimensions in the x-direction, the y-direction, and the z-direction;
wherein the three or more waveguide segments comprise first, second, and third waveguide segments, wherein the signal path direction passes progressively from the first waveguide segment to the second waveguide segment to the third waveguide segment, and wherein the first, second, and third waveguide segments are progressively staggered in the signal path direction such that:
projections of the first and second waveguide segments on the signal path direction partially overlap;
projections of the second and third waveguide segments on the signal path direction partially overlap; and
projections of the first and third waveguide segments on the signal path direction do not overlap; and
wherein the substrate comprises a plurality of staggered waveguide planar structures and a surrounding planar structure, wherein each of said three or more waveguide segments is at least partially disposed within a corresponding one of the plurality of staggered waveguide planar structures;

wherein a first surface of the surrounding planar structure abuts at least part of a surface of an outer one of the plurality of staggered waveguide planar structures and wherein a second surface of the surrounding planar structure spaced from the first surface by a thickness of the surrounding planar structure does not abut any of the plurality of staggered waveguide planar structures;

wherein one of the three or more waveguide segments comprises an outer waveguide segment disposed at least partially within the outer one of the plurality of staggered waveguide planar structures such that the outer waveguide segment extends outwardly from a surface of the outer one of the plurality of staggered waveguide planar structures; and wherein the first surface of the surrounding planar structure surrounds the outer waveguide segment such that the first surface of the surrounding planar structure abuts all sides of the outer waveguide segment extending outwardly from the outer one of the plurality of staggered waveguide planar structures.

2. The multi-dimensional photonic circuit structure of claim 1 wherein the first and second photonic circuits are located proximate opposing sides of the substrate, said opposing sides spaced from each other in the z-direction by a thickness of the substrate, and wherein the three or more discrete waveguide segments are configured to provide the electromagnetic coupling at least in:
   the x- and z-directions; and/or
   the y- and z-directions.

3. The multi-dimensional photonic circuit structure of claim 1 wherein the first and second photonic circuits are located proximate a same side of the substrate, and wherein the three or more discrete waveguide segments are configured to provide the electromagnetic coupling at least in the x- and y-directions.

4. The multi-dimensional photonic circuit structure of claim 1 wherein at least one of the three or more discrete waveguide segments is disposed within the surrounding planar structure such that a surface of the at least one of the three or more discrete waveguide segments is even with a surface of the substrate.

5. The multi-dimensional photonic circuit structure of claim 1 wherein the electromagnetic coupling is defined by:
   a size of the intervening gaps in one of the x-, y-, and z-directions, and an amount of overlap between successive discrete waveguide segments in the remaining of the x-, y-, and z-directions;
   the dimensions of the three or more discrete waveguide segments; and
   an angular orientation of the three or more discrete waveguide segments relative to each other.

6. The multi-dimensional photonic circuit structure of claim 1 wherein the electromagnetic coupling is further defined by:
   a material of the substrate; and/or
   a material of the three or more discrete waveguide segments; and/or
   a temperature of at least one of the three or more discrete waveguide segments; and/or
   an absolute temperature or a relative difference between temperatures of the three or more discrete waveguide segments; and/or
   a stress of at least one of the three or more discrete waveguide segments; and/or
   an electromagnetic field across one or more of the three or more discrete waveguide segments; and/or
   a magnetic field across one or more of the three or more discrete waveguide segments; and/or
   an electric field across one or more of the three or more discrete waveguide segments.

7. The multi-dimensional photonic circuit structure of claim 1 wherein:
   an orientation of the first waveguide segment of the three or more discrete waveguide segments relative to the second waveguide segment of the three or more discrete waveguide segments is configured to provide the electromagnetic coupling between the first and second waveguide segments in the x-direction and the y-direction; and
   an orientation of the second waveguide segment relative to the third waveguide segment of the three or more discrete waveguide segments is configured to provide the electromagnetic coupling between the second and third waveguide segments in the y-direction and the z-direction.

8. The multi-dimensional photonic circuit structure of claim 1 wherein:
   an orientation of the first waveguide segment of the three or more discrete waveguide segments relative to the second waveguide segment of the three or more discrete waveguide segments is configured to provide the electromagnetic coupling between the first and second waveguide segments in the x-direction and the y-direction; and
   an orientation of the second waveguide segment relative to the third waveguide segment of the three or more discrete waveguide segments is configured to provide the electromagnetic coupling between the second and third waveguide segments in the x-direction and the z-direction.

9. The multi-dimensional photonic circuit structure of claim 1 wherein the three or more discrete waveguide segments provide the electromagnetic coupling by electromagnetic coupling an electromagnetic wave from an output of the first photonic circuit to an input of the second photonic circuit and/or from an output of the second photonic circuit to an input of the first photonic circuit.

10. The multi-dimensional photonic circuit structure of claim 1 wherein a projection of the second waveguide segment has a first half and a second half, and wherein the first, second, and third waveguide segments are progressively staggered in the signal path direction such that the first half of a projection of the second waveguide segment overlaps half of a projection of the first waveguide segment, and such that a projection of the third waveguide segment overlaps the second half of the projection of the second waveguide segment.

11. The multi-dimensional photonic circuit structure of claim 1 wherein:
   the first, second, and third waveguide segments are progressively staggered in the signal path direction such that a first offset in the signal path direction between the first and second waveguide segments is less than a second offset in the signal path direction between the first and third waveguide segments.

12. The multi-dimensional photonic circuit structure of claim 11 wherein the second offset equals a length of one of the three or more waveguide segments.

13. A method of electromagnetic coupling in a multi-dimensional photonic circuit structure comprising a substrate having a height along a z-direction, a width along an x-direction, and a length along a y-direction, the method comprising:
  progressively staggering three or more discrete parallel waveguide segments in a signal path direction, said three or more waveguide segments physically separated and disconnected from one another by intervening gaps and disposed on or at least partially within the substrate, each of said three or more discrete waveguide segments comprising single-mode waveguide segments having identical material and dimensions in the x-direction, the y-direction, and the z-direction; and
  configuring the three or more discrete waveguide segments to provide electromagnetic coupling of a propagating wave between the three or more discrete waveguide segments to couple first and second photonic circuits;
  wherein the three or more waveguide segments comprise first, second, and third waveguide segments, wherein the signal path direction passes progressively from the first waveguide segment to the second waveguide segment to the third waveguide segment, and wherein the first, second, and third waveguide segments are progressively staggered in the signal path direction such that:
    projections of the first and second waveguide segments on the signal path direction partially overlap;
    projections of the second and third waveguide segments on the signal path direction partially overlap;
    projections of the first and third waveguide segments on the signal path direction do not overlap; and
  wherein the substrate comprises a plurality of staggered waveguide planar structures and a surrounding planar structure, wherein each of said three or more waveguide segments is at least partially disposed within a corresponding one of the plurality of staggered waveguide planar structures;
  wherein a first surface of the surrounding planar structure abuts at least part of a surface of an outer one of the plurality of staggered waveguide planar structures and wherein a second surface of the surrounding planar structure spaced from the first surface by a thickness of the surrounding planar structure does not abut any of the plurality of staggered waveguide planar structures;
  wherein one of the three or more waveguide segments comprises an outer waveguide segment disposed at least partially within the outer one of the plurality of staggered waveguide planar structures such that the outer waveguide segment extends outwardly from a surface of the outer one of the plurality of staggered waveguide planar structures; and
  wherein the first surface of the surrounding planar structure surrounds the outer waveguide segment such that the first surface of the surrounding planar structure abuts all sides of the outer waveguide segment extending outwardly from the outer one of the plurality of staggered waveguide planar structures.

14. The method of claim 13 wherein the first and second photonic circuits are located proximate opposing sides of the substrate, said opposing sides spaced from each other in the z-direction by a thickness of the substrate, and wherein configuring the three or more discrete waveguide segments comprises configuring the three or more discrete waveguide segments to provide the electromagnetic coupling at least in:
  the x- and z-directions; and/or
  the y- and z-directions.

15. The method of claim 14 wherein the first and second photonic circuits are located proximate a same side of the substrate, and wherein configuring the orientation of the three or more discrete waveguide segments comprises configuring the orientation of the three or more discrete waveguide segments to provide the electromagnetic coupling between the three or more discrete waveguide segments at least in the x- and y-directions.

16. The method of claim 13 wherein configuring the three or more discrete waveguide segments comprises disposing at least one of the three or more discrete waveguide segments within the surrounding planar structure such that a surface of the at least one of the three or more discrete waveguide segments is even with a surface of the substrate.

17. The method of claim 13 wherein configuring the three or more discrete waveguide segments to provide the electromagnetic coupling comprises configuring:
  a size of the intervening gaps in one of the x-, y-, and z-directions, and an amount of overlap between successive discrete waveguide segments in the remaining of the x-, y-, and z-directions;
  the dimensions of the three or more discrete waveguide segments; and
  an angular orientation of the three or more discrete waveguide segments relative to each other.

18. The method of claim 13 wherein electromagnetic coupling between the three or more discrete waveguide segments is further defined by:
  a material of the substrate; and/or
  a material of the three or more discrete waveguide segments; and/or
  a temperature of at least one of the three or more discrete waveguide segments; and/or
  an absolute temperature or a relative difference between temperatures of the three or more discrete waveguide segments; and/or
  a stress of at least one of the three or more discrete waveguide segments; and/or
  an electromagnetic field across one or more of the three or more discrete waveguide segments; and/or
  a magnetic field across one or more of the three or more discrete waveguide segments; and/or
  an electric field across one or more of the three or more discrete waveguide segments.

19. The method of claim 13 wherein configuring the three or more discrete waveguide segments comprises:
  configuring an orientation of the first waveguide segment of the three or more discrete waveguide segments relative to the second waveguide segment of the three or more discrete waveguide segments to provide the electromagnetic coupling between the first and second waveguide segments in the x-direction and the y-direction; and
  configuring an orientation of the second waveguide segment relative to the third waveguide segment of the three or more discrete waveguide segments to provide the electromagnetic coupling between the second and third waveguide segments in the y-direction and the z-direction.

20. The method of claim 13 wherein configuring the three or more discrete waveguide segments comprises:
  configuring an orientation of the first waveguide segment of the three or more discrete waveguide segments relative to the second waveguide segment of the three or more discrete waveguide segments to provide the electromagnetic coupling between the first and second waveguide segment in the x-direction and the y-direction; and configuring an orientation of the second waveguide segment relative to the third waveguide segment of the three or more discrete waveguide segments to provide the electromagnetic coupling between the second and third waveguide segments in the x-direction and the z-direction.

21. The method of claim 13 wherein configuring the three or more discrete waveguide segments to provide the electromagnetic coupling comprises configuring the three or more discrete waveguide segments to electromagnetically couple an electromagnetic wave from an output of the first photonic circuit to an input of the second photonic circuit and/or from an output of the second photonic circuit to an input of the first photonic circuit.

22. The method of claim 13 wherein a projection of the second waveguide segment has a first half and a second half, and wherein the first, second, and third waveguide segments are progressively staggered in the signal path direction such that the first half of a projection of the second waveguide segment overlaps half of a projection of the first waveguide segment, and such that a projection of the third waveguide segment overlaps the second half of the projection of the second waveguide segment.

* * * * *